US007907548B2

(12) United States Patent
Westhoff et al.

(10) Patent No.: US 7,907,548 B2
(45) Date of Patent: Mar. 15, 2011

(54) METHOD FOR ELECTING AGGREGATOR NODES IN A NETWORK

(75) Inventors: Dirk Westhoff, Neustadt (DE); Frederik Armknecht, Worms (DE)

(73) Assignee: NEC Europe Ltd., Heidelberg (DE)

( * ) Notice: Subject to any disclaimer, the term of this patent is extended or adjusted under 35 U.S.C. 154(b) by 69 days.

(21) Appl. No.: 12/444,557

(22) PCT Filed: Oct. 6, 2006

(86) PCT No.: PCT/IB2006/003898
§ 371 (c)(1),
(2), (4) Date: Apr. 6, 2009

(87) PCT Pub. No.: WO2008/041052
PCT Pub. Date: Apr. 10, 2008

(65) Prior Publication Data
US 2010/0098090 A1 Apr. 22, 2010

(51) Int. Cl.
*H04L 12/28* (2006.01)
(52) U.S. Cl. ........ 370/256; 370/328; 370/338; 370/252; 713/189
(58) Field of Classification Search ........................ None
See application file for complete search history.

(56) References Cited

U.S. PATENT DOCUMENTS
2006/0098594 A1* 5/2006 Ganesh .......................... 370/328
2007/0064625 A1* 3/2007 Lim et al. ....................... 370/254

OTHER PUBLICATIONS

Al-Karaki J N et al : "Routing techn1ques 1-14 in Wireless sensor networks : a survey", IEEE Wireless Communications, IEEE Service Center, Piscataway, NJ, US, vol. 11, No. 6, Dec. 2004, pp. 6-28, XPOO1217358 ISSN: 1536-1284.
Dirk westhoff et al.: . "Concealed data aggregation for reverse multicast traffic in sensor networks: encryption, key distribution, and routing adaptation", IEEE Transactions on Mobile Computing, [Online] vol. 5, no. tu, Aug. 16, 2006, pp. 1417-1431, XP002444145.
Boukerche A et al: "HPEQ A Hierarchical Periodic ; Event-driven and Query-based Wireless Sensor Network Protocol"; Local Computer Networks, 2005. 30th Anniversary. The IEEE Conference on Sydney, Australia Nov. 15-17, 2005, Piscataway, NJ, USA,IEEE Nov. 15, 2005, pp. 560-567, XPOI0859256.
Levente Buttyan et al: "Spontaneous Cooperation in Multi-domain Sensor Networks"; Security and Privacy in AD-HOC and Sensor Networks Lecture Notes in Computer Science;;LNCS, Springer-Verlag, BE, vol. 3813, 2005, pp. 42-53, XP019026275.

(Continued)

*Primary Examiner* — Duc C Ho
(74) *Attorney, Agent, or Firm* — Young & Thompson

(57) ABSTRACT

A method for electing aggregator nodes in a network, wherein the network includes a plurality of sensor nodes to measure data, and at least one of the sensor nodes functioning as aggregator node to aggregate sensored data obtained by at least a subset of the sensor nodes, the network further including at least one sink node to collect data aggregated by the aggregator nodes, the method including: establishing pairwise secret keys between a current aggregator node and each sensor node of the subset of sensor nodes; at each of the sensor nodes of the subset, choosing a random number and encrypting the random number using the established key; providing a communication chain between the sensor nodes of the subset and summing the encrypted random numbers of all sensor nodes of the subset; and determining a new aggregator node on the basis of the resulting sum according to a predefined calculation scheme.

20 Claims, 1 Drawing Sheet

OTHER PUBLICATIONS

Deng et al: "INSENS: Intrusion-tolerant routing for wireless sensor networks" Computer Communications, Elsevier Science Publishers BV, Amsterdam, NL, vol. 29, No. 2, Jan. 10, 2006, pp. 216-230, XP005237935.

Castelluccia C et al : "Efficient Aggregation of encrypted data in Wireless Sensor Networks"; Mobile and Ubiquitous Systems: Networking and Services, 2005. Mobiquitous 2005. The Second Annual International Conference on San Diego, CA, USA Jul. 17-21, 2005, Piscataway, NJ, USA, IEEE, Jul. 17, 2005, pp. 109-117, XPOI085389.

Acharya M et al: "Secure Comparison of Encrypted Data in Wirless Sensor Networks"; Modeling and Optimization in Mobile, AD HOC, Andwireless Networks, 2005. WIOPT 2005. Third International Symposium on Riva Del Garda, Trentino, Italy Apr. 4-6, 2005, Piscataway, NJ, USA, IEEE, Apr. 4, 2005, pp. 47-53, XP010789159.

International Search Report dated Aug. 6, 2007, in PCT application.

\* cited by examiner

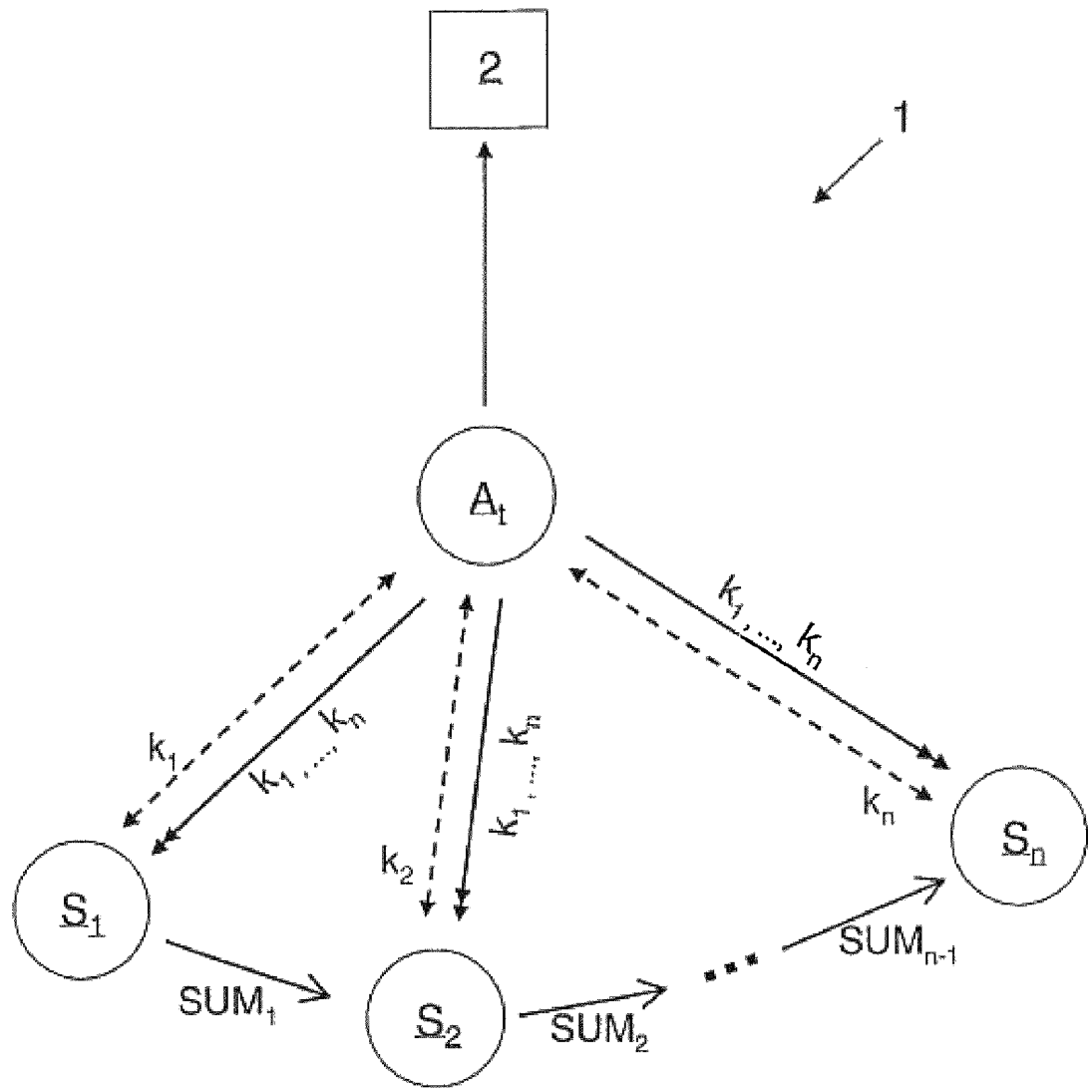
Fig.

METHOD FOR ELECTING AGGREGATOR NODES IN A NETWORK

The present invention relates to a method for electing aggregator nodes in a network, wherein the network comprises a plurality of sensor nodes to measure data, and wherein at least one of the sensor nodes functions as aggregator node to aggregate sensored data obtained by at least a subset of the sensor nodes, and wherein the network further comprises at least one sink node to collect data aggregated by the aggregator nodes.

Methods as mentioned above are well known in practice and are of special importance in the context of wireless sensor networks (WSNs). WSNs are ad-hoc networks, composed of small sensors with limited computation and energy capacities.

All sensors of a sensor network are sensor nodes which communicate in a wireless way and which consist in general of a probe, a processing unit, a communication device and a battery. The sensor nodes comprise the functionality of data acquisition, communications and computation on a minimum of space. Due to their limited capacities sensor nodes, in general, don't comprise a tamper resistant unit.

Wireless sensor networks are becoming increasingly popular in many spheres of live. To provide examples where sensor networks are used, monitoring and controlling machines, controlling (intra- and extra-corporal) health parameters or environment monitoring (like temperature, humidity and seismic activity) should be mentioned here. The range of application possibilities for sensor networks is almost infinite, though. In specific fields, such as examining the contamination of water or weather forecasting, for example, it is extremely advantageous that the sensor nodes can be realized in miniature size and that they can easily be fixed and used in regions hard to access.

Critical parameters restricting under certain circumstances the application possibilities of sensor networks are in particular physically defined factors of the single sensor nodes, such as, for instance, the reach of their sender, processor power, battery capacity, existing storage space and the like. Since the single sensor nodes—in contrast to the sink node where the sensored data comes together—are physically restricted in many ways, the energy-efficient organization of the sensor network is of outstanding importance. In this context it first has to be stated that the transmission of all the sensored data to the sink node would cause by far too much data traffic, so the data is usually accumulated first within the network at special sensor nodes functioning as so called aggregator nodes. Sending all the sensored data to its final destination would result in a lifetime which would be unacceptably short since the energy consumption of the devices, i.e. the sensor nodes, during sending increases in a linear way with the amount of data to send.

In general, the lifetime of wireless sensor networks is divided into epochs with each epoch having a specific duration. An aggregator node is usually elected for the duration of one epoch during which it receives data from other sensor nodes, does in-network processing on these data and forwards the resulting data. For the next epoch a new sensor node is elected as aggregator node.

One major objective of an aggregator node election mechanism is to flatly balance the remaining energy resources of the single sensor nodes of the network. Consequently, sensor nodes with higher remaining energy resources should preferably be elected for the next epoch within the WSN.

On the other hand, with respect to malicious behavior it is important to take into account that there are some good reasons for sensor nodes to cheat during an aggregator election process. Motivation for cheating may be twofold: On the one hand sensor nodes may have an interest to not become aggregator node since they do not want to waste their remaining energy. On the other hand sensor nodes may have a contrarian interest, i.e. an interest to become aggregator node, since they intend to spy out as many data as possible.

It is therefore an object of the present invention to improve and further develop a method of the initially described type for electing aggregator nodes in a network in such away that the aggregator node electing process is secure, trustable and fair in the sense that a single sensor node is not enabled to manipulate the electing process in whatever direction.

In accordance with the invention, the aforementioned object is accomplished by a method comprising feature of claim 1. According to this claim, such a method is characterized in establishing pairwise secret keys between a current aggregator node and each sensor node of the subset of sensor nodes from which the current aggregator node obtains sensored data;

at each of the sensor nodes of said subset, choosing a random number and encrypting the random number using the established key;

providing a communication chain between the sensor nodes of said subset and summing the encrypted random numbers of all sensor nodes of said subset; and determining a new aggregator node on the basis of the resulting sum according to a predefined calculation scheme.

According to the invention it has first been recognized that any manipulation, whatever the concrete motivation of a cheating sensor node may be, can be prevented when the whole election processes is carried out in a fully randomized way. Moreover, it has being found that a robust aggregation node election process with respect to cheating sensor nodes is the one where a sensor node's input to the decision process is as good as the input of any other involved sensor node. In accordance with the invention the election process is not based on any concrete election metric and attackers can't feed profitable values into the decision process in order to influence the aggregator node election in a controlled way.

As regards the key agreement between the current aggregator node and each sensor node of the subset of sensor nodes from which the current aggregator node obtains sensor data, the current aggregator node can broadcast a multitude of data pairs, each data pair comprising a key $k_i$ and an identifier $ID_i$, respectively, in a concealed manner to all sensor nodes of this subset. Each sensor node of the subset can then choose randomly one data pair from the multitude of data pairs and break the concealment to obtain the key $k_i$. This procedure, which is known—as seen by itself—as Merkle's Puzzle, allows for the establishment of pairwise secret keys between the aggregator node and each sensor node, i.e. the sensor nodes among themselves do not know the keys the other sensor nodes agreed upon.

The concealment of the broadcasted data pairs can be achieved by way of an encryption. With respect to a low computational effort for the sensor nodes to break the encryption it is advantageous to choose a lightweight encryption. Concretely, it would be possible to use a weak block cipher, for example RC5.

As sending data is a very costly operation, the number of data pairs broadcasted by the current aggregator node is specified, in an advantageous manner, according to given security requirements. Concretely, if one expects attackers that possess rather low capabilities it is sufficient to broadcast fewer data pairs than it might be in the case of a more powerful and potential attacker. On the assumption that the performance ratio of an attacker versus sensor nodes is available a security level is exactly measurable and the required number of broadcasted data pairs (as well as the strength of the applied encryption) can be exactly determined.

As a last step in the context of the key agreement it can be provided that each sensor node broadcasts the identifier of its chosen data pair. The broadcasted identifier can serve as a commitment so that each sensor node is able to check whether the other sensor nodes act conformably.

As regard the summation process, it is possible that a certain order of the sensor nodes within the communication chain is defined. For example, an order can be determined according to the distance of the sensor nodes to the current aggregator node. This process could be conducted according to a predefined protocol. Alternatively, the order could be determined dynamically or according to IDs of the sensor nodes. According to a further alternative the order is simply determined on the part of the current aggregator node, although, on the part of the current aggregator node, this method allows for certain exertion of influence on the election process.

In an especially advantageous manner, the encryption scheme E used for encrypting the random numbers $r_i$ under the keys $k_i$ is homomorphic both with respect to the random numbers $r_i$ and to the key $k_i$. This means that $$E(k,r)+E(k,r')=E(k+k',r+r').$$

Concretely, a homomorphic encryption scheme as proposed by C. Castelluccia, E. Mykletun, and G. Tsudik in "Efficient Aggregation of encrypted data in Wireless Sensor Networks" could be employed.

In order to give each sensor node the possibility to check that the aggregator node election process has being carried out correctly and that neither the current aggregator node nor any other sensor node has cheated the current aggregator node can reveal all established keys after the summation of the encrypted random numbers is completed. When the established keys are broadcasted by the current aggregator node each sensor can firstly check whether its own established key resides among the broadcasted keys. Additionally, it could be demanded that the aggregator also reveals which key fits to which concealed pair broadcasted at the beginning. This would prevent the collaboration of the aggregator with a malicious node to introduce new keys after the key agreement phase is over. Secondly, each sensor node can sum the established keys and apply the resulting sum as a key to decrypt the sum of the encrypted random values. This operation is possible due to the double homomorphic characteristic of the employed encryption scheme. On the basis of the result of the decryption the new aggregator node can be determined.

As regards a further prevention of cheating, a time span $\Delta t$ can be defined giving the maximum allowed time span between the moment of broadcasting the data pairs by the current aggregator node and the moment of broadcasting the established keys. This feature takes into consideration that the current aggregator node can only cheat in a meaningful manner if it is aware of the final encrypted sum of the random values of all involved sensor nodes. By pre-configuring $\Delta t$ as specified above one can clearly restrict the remaining time for the current aggregator node to cheat by modifying keys in a meaningful way.

To avoid any collaboration between the current aggregator node and one of the sensor nodes it can be provided that the election process is aborted and restarted form the beginning if at least one sensor node registers any irregularities. For example, an abortion and restart of the election process can be performed if one of the sensor nodes registers that the current aggregator node broadcasts anything else than the actual established keys.

There are several ways how to design and further develop the teaching of the present invention in an advantageous way. To this end, it is to be referred to the patent claims subordinate to patent claim 1 on the one hand, and to the following explanation of a preferred example of an embodiment of the invention illustrated by the FIGURE on the other hand. In connection with the explanation of the preferred example of an embodiment of the invention by the aid of the FIGURE, generally preferred embodiments and further developments of the teaching will be explained.

In the drawings:

The only FIG. is a schematic view of an embodiment of an application scenario of a method according to the invention for electing aggregator nodes in a network.

Referring more particularly to the drawings, the only FIG. depicts an application scenario of a method according to the invention. The FIG. shows—as a scheme—a sensor network 1 with a multitude of sensor nodes being labeled according to their number by $S_1$ to $S_n$. The data sensored by the sensor nodes $S_1$ to $S_n$ is aggregated by an aggregator node $A_t$. Usually upon the request from a sink node 2—which is, in contrast to the sensor nodes $S_i$ and the aggregator node $A_t$, a specific device with sufficiently extensive physical resources—, the aggregator node $A_t$ forwards the aggregated data to the sink node 2. For reasons of clarity, in the FIG. only one single aggregator node $A_t$ is shown and no intermediate nodes between $A_t$ and the sink node 2 exist.

The sensor network 1 is shown in the status of an epoch t in which the sensor node labeled as $A_t$ functions as aggregator node. At the beginning of the next epoch t+1 a protocol starts to randomly elect one of the sensor nodes $S_1$ to $S_n$ to be the next aggregator node $A_{t+1}$. The aggregator node election process, in principal, can be distinguished in three phases:

The first phase is the key agreement phase. The goal of this phase is to establish pairwise secret keys between the current aggregator node $A_t$ and each sensor node $S_i$. For this purpose aggregator node $A_t$ applies the so called Merkle's Puzzle to establish pairwise keys $k_i$ with each of the sensor nodes $S_1, \ldots, S_n$. During this process, each sensor node $S_i$ broadcasts an identifier $ID_i$ connected to its key $k_i$ which can be used as a commitment to this key afterwards if needed. Since the aggregator election process lasts only for a well defined short time interval, the security provided by the Merkle Puzzle only need to hold for this time. In the FIG. the key agreement is indicated by the dotted lines with arrows at both ends thereof.

After the key agreement is completed a second phase of the aggregator node election process is carried out. The goal of this second phase is to securely compute the sum of the sensors' contribution to the election process. Secure hereby means that the no node sees the contribution of any other node before the computation of the sum is over, preventing any cheater to influence the outcome in a controlled way.

Each sensor node $S_i$ chooses its random contribution $r_i$ to the election process and encrypts it with E and $k_i$. E(k, r) denotes the encryption of r under a key k by an encryption scheme E that is homomorphic in k and r. This means that $$E(k,r)+E(k',r')=E(k+k',r+r').$$

Each sensor node $S_i$ combines the result with the encrypted random contribution coming from other sensor nodes $S_j$.

More precisely, a communication chain between the nodes is provided, that is $S_1$ reports to $S_2$, $S_2$ to $S_3$, and so on. Concretely, when $S_i$ receives $$SUM_{i-1}=E(k_1+\ldots+k_{i-1},r_1+\ldots+r_{i-1}),$$

it computes $$SUM_i=E(k_i,r_i)+SUM_{i-1}=E(k_1+\ldots+k_i,r_1+\ldots+r_i),$$

starting at $S_1$ with $SUM_1=E(k_1,r_1)$. Subsequently $S_i$ forwards $SUM_i$ to $S_{i+1}$. The process ends when all n nodes have contributed to the encrypted sum of the contributions.

No sensor node $S_i$ can cheat in a meaningful manner since it cannot foresee the impact of its own random value $r_i$ on the final result $R=r_1+\ldots+r_n$ without knowing the contributions of the other sensor nodes $S_i$ which would require the knowledge of their keys.

The aggregator node election process is terminated by a third phase. In this phase the actual aggregator node $A_t$ broadcasts the actual keys to all the sensor nodes $S_i$. Each $S_i$ decrypts $SUM_n$ by computing $k=k_1+\ldots+k_n$ and the decryption $$D(k,SUM_n)=R=r_1+\ldots+r_n.$$

The sensor node $S_i$ for which it holds that $i=R \bmod n$ is determined as the new aggregator node $A_{t+1}$.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for electing aggregator nodes in a network, wherein the network (1) comprises a plurality of sensor nodes ($S_i$) to measure data, and wherein at least one of the sensor nodes ($S_i$) functions as aggregator node (A) to aggregate sensored data obtained by at least a subset of the sensor nodes ($S_i$), and wherein the network further comprises at least one sink node (2) to collect data aggregated by the aggregator nodes (A), the method comprising:
   establishing pairwise secret keys ($k_i$) between a current aggregator node ($A_t$) and each sensor node ($S_i$) of the subset of sensor nodes from which the current aggregator node ($A_t$) obtains sensored data;
   at each of the sensor nodes ($S_i$) of said subset, choosing a random number ($r_i$) and encrypting the random number ($r_i$) using the established key ($k_i$);
   providing a communication chain between the sensor nodes ($S_i$) of said subset and summing the encrypted random numbers ($r_i$) of all sensor nodes ($S_i$) of said subset; and
   determining a new aggregator node ($A_{t+1}$) on the basis of the resulting sum according to a predefined calculation scheme.

2. The method according to claim 1, wherein the current aggregator node ($A_t$), in the context of the key establishment, broadcasts a multitude of data pairs, each data pair comprising a key ($k_i$) and an identifier ($ID_i$), respectively, in a concealed manner to all sensor nodes ($S_i$) of said subset.

3. The method according to claim 2, wherein each sensor node ($S_i$) of said subset chooses randomly one data pair from the multitude of data pairs and breaks the concealment to obtain the key ($k_i$).

4. The method according to claim 2, wherein the concealment of the broadcasted data pairs is achieved by way of a preferably lightweight encryption.

5. The method according to claim 4, wherein the broadcasted data pairs are encrypted with a weak block cipher or using a short key.

6. The method according to claim 4, wherein each sensor node ($S_i$) of said subset chooses randomly one data pair from the multitude of data pairs and breaks the concealment to obtain the key ($k_i$).

7. The method according to claim 2, wherein the number of data pairs broadcasted by the current aggregator node ($A_t$) is specified according to given security requirements.

8. The method according to claim 7, wherein each sensor node ($S_i$) of said subset chooses randomly one data pair from the multitude of data pairs and breaks the concealment to obtain the key ($k_i$).

9. The method according to claim 2, wherein each sensor node ($S_i$) broadcasts the identifier ($ID_i$) of its chosen data pair as a commitment.

10. The method according to claim 9, wherein each sensor node ($S_i$) of said subset chooses randomly one data pair from the multitude of data pairs and breaks the concealment to obtain the key ($k_i$).

11. The method according to claim 1, wherein the order of the sensor nodes ($S_i$) within the communication chain is determined according to a well defined rule.

12. The method according to claim 1, wherein an encryption scheme E used for encrypting the random numbers ($r_i$) under the keys ($k_i$) is homomorphic both with respect to the random numbers ($r_i$) and to the keys ($k_i$).

13. The method according to claim 12, wherein, after completing the summation of the encrypted random numbers ($r_i$), the current aggregator node ($A_t$) broadcasts the established keys ($k_i$) to all sensor nodes ($S_i$) of said subset.

14. The method according to claim 13, wherein a maximum allowed time $\Delta t$ is defined between the moment of broadcasting the data pairs and the moment of broadcasting the established keys ($k_i$).

15. The method according to claim 13, wherein each sensor node ($S_i$) of said subset sums the established keys ($k_i$) and applies the resulting sum (k) to decrypt the sum of the encrypted random values ($r_i$).

16. The method according to claim 12, wherein each sensor node ($S_i$) of said subset sums the established keys ($k_i$) and applies the resulting sum (k) to decrypt the sum of the encrypted random values ($r_i$).

17. The method according to claim 16, wherein a maximum allowed time $\Delta t$ is defined between the moment of broadcasting the data pairs and the moment of broadcasting the established keys ($k_i$).

18. The method according to claim 1, wherein the sensor node ($S_i$) of said subset for which it holds that $i=R \bmod n$, with R denoting the sum of the random values ($r_i$) is determined as new aggregator node ($A_{t+1}$) wherein R mod n represents the remainder when R is divided by n, in accordance with modular arithmetic.

19. The method according to claim 18, wherein a maximum allowed time $\Delta t$ is defined between the moment of broadcasting the data pairs and the moment of broadcasting the established keys ($k_i$).

20. The method according to claim 1, wherein the election process is aborted and restarted from the beginning if at least one sensor node ($S_i$) registers any irregularities.

* * * * *